Oct. 4, 1927.  
T. FRANZEN  
1,644,468  
VEHICLE SPRING SUSPENSION  
Filed Dec. 2, 1924   2 Sheets-Sheet 1

Inventor  
Tore Franzén

Oct. 4, 1927.

T. FRANZEN 1,644,468

VEHICLE SPRING SUSPENSION

Filed Dec. 2, 1924

Inventor
Tore Franzén

Patented Oct. 4, 1927.

1,644,468

UNITED STATES PATENT OFFICE.

TORE FRANZEN, OF DETROIT, MICHIGAN, ASSIGNOR TO DETROIT STEEL PRODUCTS COMPANY, OF DETROIT, MICHIGAN, A CORPORATION OF MICHIGAN.

VEHICLE SPRING SUSPENSION.

Application filed December 2, 1924. Serial No. 753,519.

The invention relates to vehicle spring suspensions and has for one of its objects the provision of a progressively increasing resistance to the flexing of a load carrying spring. Another object is the provision of an arrangement for minimizing the torque exerted upon a load carrying spring when the resistance offering means affects the spring.

With these as well as other objects in view the invention resides in the novel features of construction and combinations and arrangements of parts as more fully hereinafter set forth.

Figure 1:
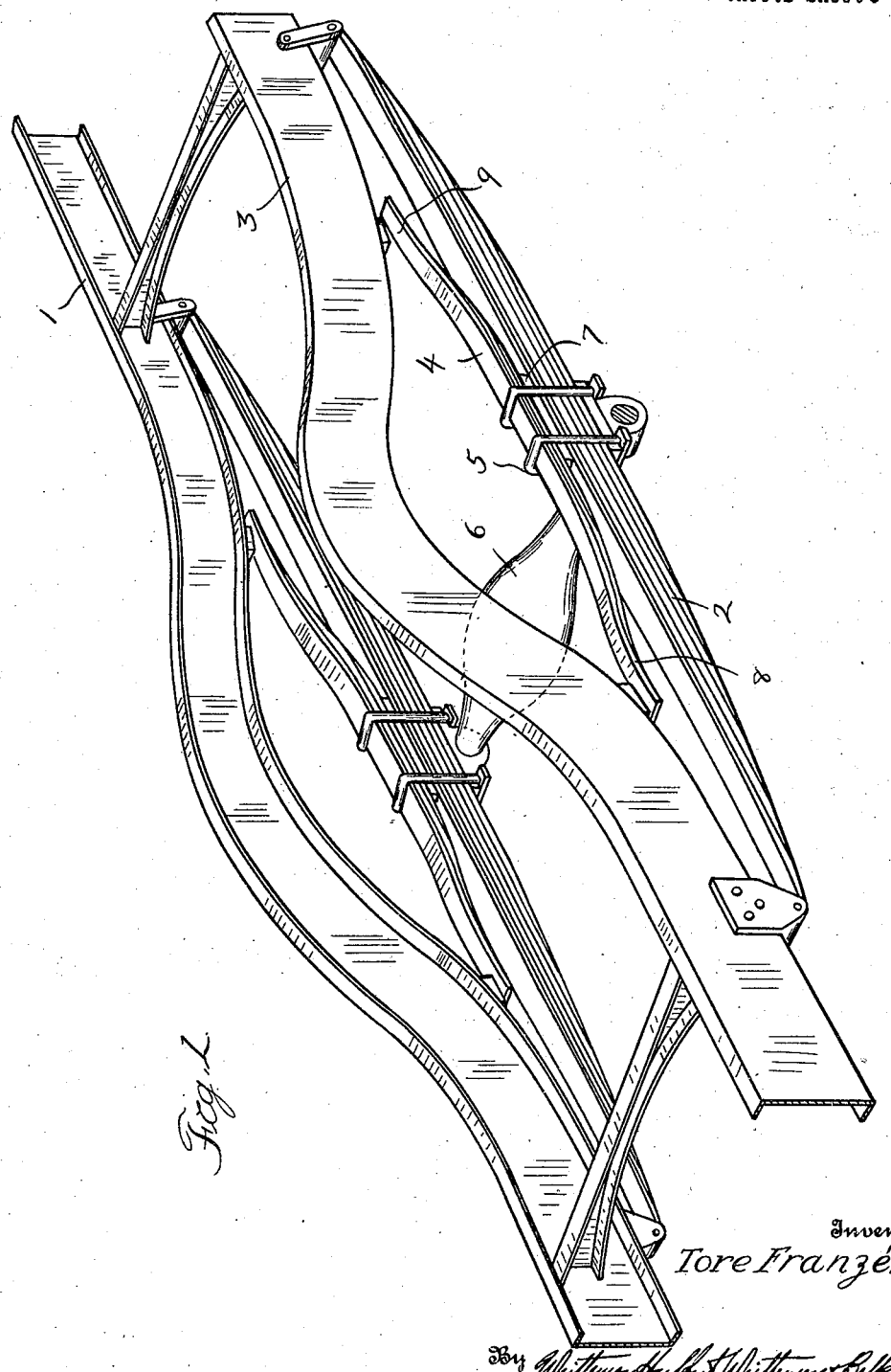
Figure 1 is a perspective view of a portion of a motor vehicle frame having applied thereto a spring suspension embodying my invention.

In the vehicle spring suspension shown in Figure 1, 1 is the frame of a motor vehicle and 2 the main load carrying springs connected to the side sills 3 of the frame. These main springs are preferably semielliptic and are suitably pivotally connected at their ends to the side sills. 4 are auxiliary springs for resisting the flexing of the main springs, there being an auxiliary spring above each main spring and spaced therefrom. Each auxiliary spring is connected to its respective main spring preferably with the same shackles 5 which connect the main spring to the axle housing 6, a spacer 7 being provided between the clamped portions of the main and auxiliary springs so that these springs are prevented from coming into contact at any time.

Each auxiliary spring has an end portion 8 which is longer and more flexible that the end portion 9 and this spring is also preferably arranged with relation to the frame 1 that the end of the end portion 8 will come into contact with the frame or a stop secured thereto prior to contact of the end of the end portion 9 with the frame or a stop secured thereto. As a consequence the resistance offered by the auxiliary spring to the flexing of the main spring is initially the resistance offered by the end portion 8 of the auxiliary spring and then the resistance offered by both the end portion 8 and end portion 9 so that it may be said that this resistance progressively increases.

To minimize the torque upon the main springs and frame the auxiliary springs 4 at opposite sides of the frame are reversely arranged. That is, the end portion 8 of the auxiliary spring at one side of the frame is in advance of the anchored portion of the auxiliary spring while the end portion 8 of the other auxiliary spring is in rear of the anchored portion of that spring. With this arrangement the torque imposed by the auxiliary spring at one side of the frame when its end portion 8 comes into contact with the frame or stop thereon is in the opposite direction to that imposed by the auxiliary spring at the other side of the frame when its end portion 8 comes into contact with the frame or stop thereon, the two substantially counterbalancing each other and the stress being carried through the axle housing 6.

Figure 2:
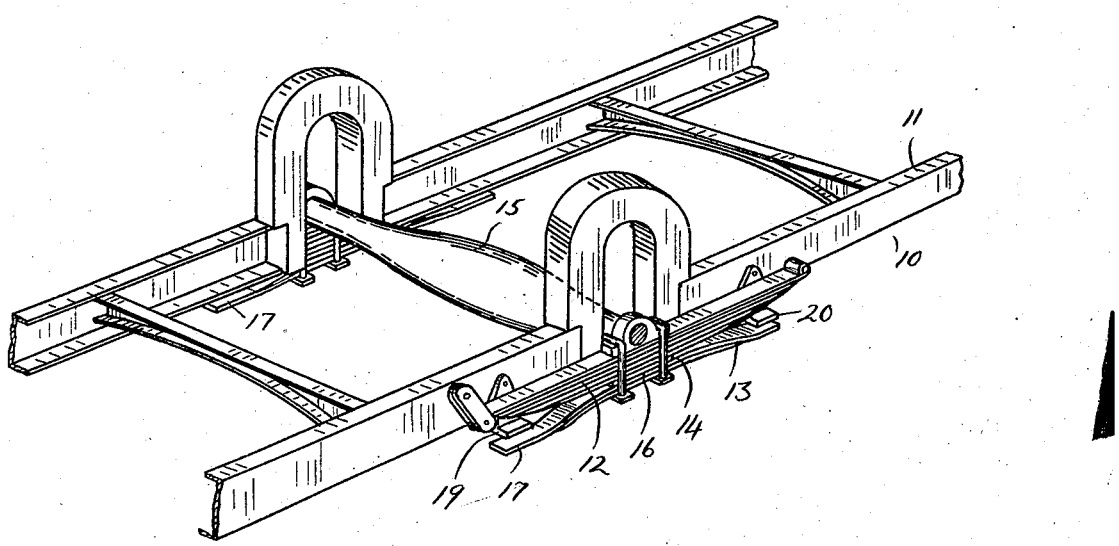
Figure 2 is a similar view showing a modified construction.

As shown in Figure 2, 10 is the frame having the side sills 11. 12 are the main springs suitably connected to the side sills and 13 are the auxiliary springs connected to the main springs by the shackles 14 which connect the main springs to the axle housing 15, there being suitable spacer blocks 16 between the anchored portions of the main and auxiliary springs for spacing the same from each other. In this construction each auxiliary spring is located below its respective main spring and has the end portion 17 which is of greater length and more flexible than the end portion 18 and is adapted to come into contact with the stop 19 prior to contact of the end portion 18 with the stop 20. These stops 19 and 20 are in the nature of brackets secured to the side sills 11. These auxiliary springs are preferably reversely arranged in the same manner as the auxiliary springs of Figure 1.

What I claim as my invention is:

1. The combination with a vehicle frame, of a spring secured in spaced relation thereto and means comprising an auxiliary spring secured to said spring and having the end portion thereof slidably engaging said frame for offering a progressively increasing resistance to the flexing thereof.

2. The combination with a vehicle frame, of a spring secured thereto, an auxiliary spring secured to said first-mentioned spring and means upon said frame for limiting the movement of different portions thereof at different times.

3. The combination with a vehicle frame, of a spring secured thereto, an auxiliary spring secured to said first-mentioned spring and having end portions of different strength and means upon said frame for limiting the movement of said end portions at different times.

4. The combination with a vehicle frame, of a spring secured thereto, an auxiliary spring secured to and spaced from said first-mentioned spring and having end portions of unequal length and strength and means upon said frame for successively engaging the end portion of greater length and less strength and the end portion of less length and greater strength.

5. The combination with a vehicle frame, of main springs secured to opposite sides thereof, an axle housing secured to said main springs, an auxiliary spring secured to each of said main springs and having end portions of different strength, said auxiliary springs being reversely arranged and means upon said frame for successively limiting the movements of the end portions of said auxiliary springs.

6. The combination with a vehicle frame and an axle housing, of main springs secured to said axle housing at opposite sides of said frame, an auxiliary spring secured to each of said main springs and means upon said frame for engaging at the same time a portion of one auxiliary spring in rear of said axle housing and a portion of the other auxiliary spring in advance of said axle housing.

7. The combination with a vehicle frame, of a spring secured thereto, and a member secured to and spaced from said spring having a sliding engagement with said frame for offering successively increasing resistance to the flexing of said spring.

8. The combination with a vehicle frame, of a spring connected thereto and means comprising an auxiliary spring having portions slidably engaging said frame and offering successively increasing resistance to the flexing of said spring.

In testimony whereof I affix my signature.

TORE FRANZEN.